United States Patent [19]
Robbins et al.

[11] Patent Number: 5,764,053
[45] Date of Patent: Jun. 9, 1998

[54] APPARATUS FOR USE IN AN OPTICAL SYSTEM, INCLUDING A MOVABLE SHUTTER PROVIDING AN APERTURE, PREFERABLY FOR USE IN DIFFERENTIAL OPTICAL ABSORPTION SPECTROSCOPY (DOAS)

[75] Inventors: John Robbins, Alliston; Shachar Nadler, Bolton, both of Canada

[73] Assignee: Unisearch Associates Inc., Concord, Canada

[21] Appl. No.: 502,509

[22] Filed: Jul. 14, 1995

[51] Int. Cl.⁶ .................... G01B 7/14; G01N 33/00; G01J 3/04; G01J 3/42
[52] U.S. Cl. .................. 324/226; 324/207.18; 356/326
[58] Field of Search .............. 324/207.18, 207.22, 324/207.24, 226, 234, 239, 262; 356/319, 326, 329

[56] References Cited

U.S. PATENT DOCUMENTS

| | | |
|---|---|---|
| Re. 29,939 | 3/1979 | Williams . |
| 3,459,481 | 8/1969 | Boronkay . |
| 3,756,721 | 9/1973 | Williams . |
| 4,575,243 | 3/1986 | Witte . |
| 4,658,214 | 4/1987 | Peterson .................. 324/260 |
| 4,762,412 | 8/1988 | Ohkubo et al. . |
| 4,963,023 | 10/1990 | Goldovsky et al. . |
| 4,964,725 | 10/1990 | Goldovsky et al. . |
| 5,285,254 | 2/1994 | De Sa . |
| 5,351,150 | 9/1994 | Lichtman et al. . |

*Primary Examiner*—Walter E. Snow
*Attorney, Agent, or Firm*—Bereskin & Parr

[57] ABSTRACT

An apparatus for use in Differential Optical Absorption Spectroscopy (DOAS) or in other optical apparatus provides a moveable or oscillating aperture. It has a sensor for detecting the position of the aperture, and a drive for oscillating the aperture; the drive and sensor can comprise coils forming a linear variable differential transformer, and the aperture can be spring biased to a neutral position. A control circuit is connected between the coil or other sensor and the drive coils, so that the motion of the aperture follows a desired profile. This enables significant parts of the apertures motion to be constrained to be linear. The aperture can be provided in a shuttle mounted on extension arms, whose ends are connected to resilient biasing means which serve both to support the shuttle and to bias it. More preferably, extension arms extend through pole pieces of magnets, which provide a magnetic field for drive coils. Another aspect of the invention provides a telescope apparatus, for a DOAS technique, including a baffle moveable between calibration and operational positions. This enables light from the light source to be transmitted either for measurement or for calibration allowing for changes in lamp output, etc.

10 Claims, 7 Drawing Sheets

APPARATUS FOR USE IN AN OPTICAL SYSTEM, INCLUDING A MOVABLE SHUTTER PROVIDING AN APERTURE, PREFERABLY FOR USE IN DIFFERENTIAL OPTICAL ABSORPTION SPECTROSCOPY (DOAS)

FIELD OF THE INVENTION

This invention relates to Differential Optical Absorption Spectroscopy (DOAS) apparatus and to a scanner mechanism for use in such DOAS or other optical apparatus, and more particularly is concerned with a scanner mechanism for providing a linear motion for optical apparatus.

BACKGROUND OF THE INVENTION

DOAS is a known technique for analyzing various substances. Briefly, the linear dispersion of a spectrum at the exit focal plane of a spectrograph passes through a moveable aperture, which effectively scans across the spectrum. A photodiode or photo multiplier receives the output. If the aperture or slit moves in a linear motion across the focal plane, the spectrum is reproduced as a linear time-varying output from the photo detector.

DOAS techniques have been proposed for analyzing atmospheric pollutants. One problem with this technique is that atmospheric turbulence constitutes a major source of noise. To eliminate this, measurements need to be made rapidly. Effectively, the spectrum needs to be scanned at a rate of at least 30 Hertz to avoid noise effects.

In earlier DOAS instruments, a moving slit was provided as a series of radial slits etched in the rim of a large diameter sheet-form wheel. The large size is necessary so that the motion of each slit due to the rotation approximates a linear motion, although the motion necessarily has some rotational component.

There are two main problems with the rotating wheel or disk arrangement. One is that the rotational speed of the wheel must be maintained very constant to prevent blurring of the spectrum. Such rigid control increases both the size and the cost of the instrument. The second disadvantage of the slits do not remain vertical as the wheel rotates causing distortion of the spectrum. Also, the motion of the slit is never truly linear.

A technique is disclosed in U.S. Pat. No. 3,756,721 (David T. Williams), although this is for a spectrometer and is not known for a DOAS systems. This provides a so-called "wobbling single slit" which is intended to reciprocate at a constant amplitude. While this arrangement may overcome the rotational effects always present with the rotating disk or wheel, it has numerous other disadvantages. The "wobbling slit" is a resonant structure that produces a sinusoidal motion of some 1 mm peak amplitude. In this sense, it is similar to other well known modulation methods using resonant mechanical devices, such as turning forks, that were employed in various known correlation spectrometers.

In this Williams device, only one coil actually produces drive, with another coil only providing motion feedback to the oscillator circuit. The mechanical structure and the circuitry reach equilibrium when the amplitude generated by the pickup coil as a result of the motion of a magnet and amplified just maintains the oscillatory motion of the magnet. The "Q" of the system is primarily determined by the mechanical "Q" of the spring-mass structure, the mass being the magnet and the components connecting it to the slit, the springs being cantilevers. The amplitude is therefore only maintained on an "average" basis, probably on the order of 1 second or so.

The use of the Williams device is practically limited to scanning a single absorption feature, which the author claims is superior to analyzing a wider spectral range. However, a measurement over a single line is very susceptible to interferences from other gases that happen to show an absorption feature at or close to the chosen line. In the visible and UV spectrum, there are few unambiguous single molecular absorption features. The whole point of correlation analysis over a wider spectral range is to use multiple features which, in toto, are characteristic of a given species. The risk of misidentification is thus substantially reduced.

The main difference between current DOAS techniques and the earlier correlation mask methods is the ability to deal efficiently with complex spectra containing multiple absorption features with irregular spacing. The correlation mask and its displacement (modulation) can be optimised only for a single gas, e.g. $NO_2$ and $SO_2$, which shows regular approximately equal strength absorption bands. There is no way a correlation mask can deal with multiple species or extract a minor species from a complex spectrum, such as is regularly done in DOAS data processing.

If the amplitude of the Williams scanner was to be increased to include multiple lines (which probably could only be done with difficulty) the resultant spectrum would be distorted because of the sinusoidal variation of displacement with time. Absorption features either side of the neutral position would be apparently widened in comparison to a feature found at the neutral position. This would require that a similarly distorted reference spectrum would have to be generated for each species sought.

SUMMARY OF THE PRESENT INVENTION

Accordingly, it is desirable to provide a linear device, i.e. a device for a spectrometer or other optical apparatus, which ensures that the variation of the wavelength of the transmitted light is linear with respect to time. Such a device should permit production of undistorted absorption or emission spectra of significantly wide intervals, e.g. 50 nm, that are directly comparable with those obtained by conventional spectroscopy, but at the high scan rates needed to overcome noise effects in remote sensing applications.

In accordance with the present invention, there is provided an apparatus for use in an optical system, the apparatus comprising: a moveable aperture; sensor means for detecting the position of the aperture; drive means for displacing the aperture; and a control circuit connected between the sensor means and the drive means, for controlling the drive means.

The control circuit includes a separate input for a desired motion of the aperture, the control circuit controlling the drive means, whereby the moveable aperture follows the desired motion. The drive means comprises a pair of electromagnetic drive coils, and the sensor means comprises a pair of sensor coils, so that the drive and sensor coils comprise a linear variable differential transformer.

The moveable aperture is provided by a shuttle, and the drive coils are secured to the shuttle and include stationary magnetic field means for driving the drive coils, the drive coils being connected to the control circuit. The stationary sensor coils are mounted for detecting movement of the drive coils.

BRIEF DESCRIPTION OF THE DRAWING FIGURES

For a better understanding of the present invention and to show more clearly how it may be carried into effect, reference will now be made, by way of example, to the accompanying drawings, which show a preferred embodiment of the present invention and in which.

DESCRIPTION OF PREFERRED EMBODIMENT

Figure 1:
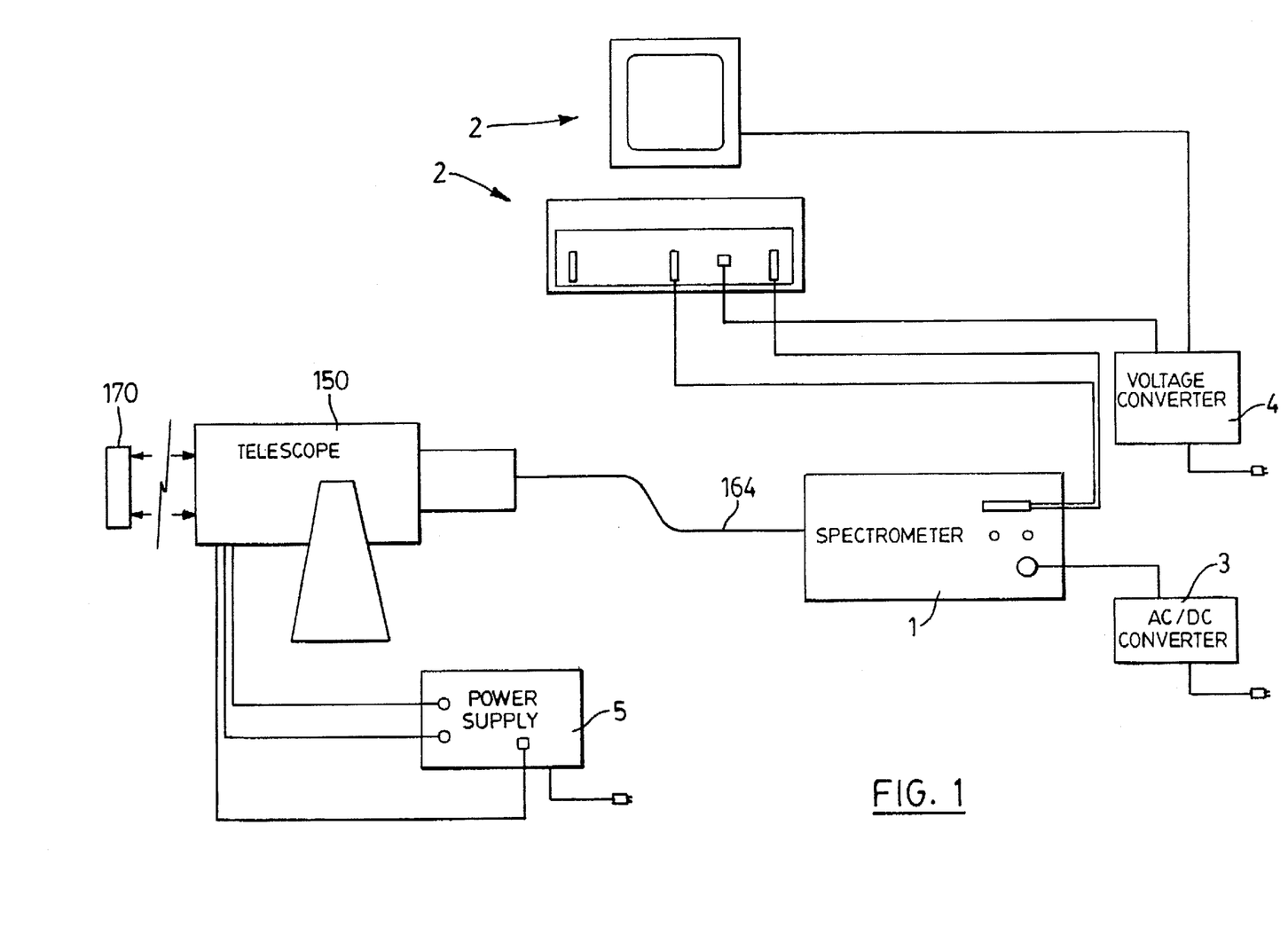
FIG. 1 is an overall schematic view of a DOAS apparatus in accordance with the present invention.

Referring first to FIG. 1, a spectrometer 1 is connected to a data-gathering computer 2. The spectrometer 1 and computer 2 are provided with appropriate power supplies indicated at 3, 4.

A telescope 150 with a retroreflector 170, detailed below, is connected by an optical fibre cable 164 to the spectrometer 1. Again, an appropriate power supply 5 is provided for the telescope 150.

Figure 2:
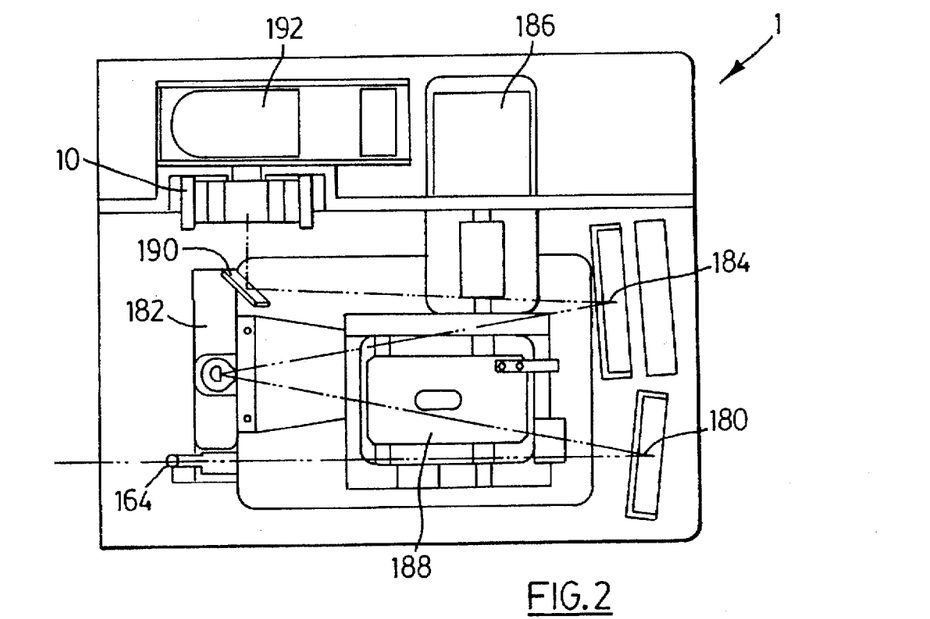
FIG. 2 shows a schematic diagram of a spectrometer forming part of the apparatus of FIG. 1.

Details of spectrometer 1 are shown in FIG. 2. The input from the optical fibre is indicated at 164. This is reflected by a collimated mirror 180 onto a defraction grating 182. In known manner, different wavelengths are defracted at different angles from the defraction grading 182 onto a camera mirror 184. Accordingly, the defraction grating 182 is pivotally mounted and is driven by a stepper motor 186 through a drive mechanism 188. The stepper motor 186 is used to rotate the defraction grading 182 to select a desired range of wavelengths.

The camera mirror 184 in turn reflects the light onto an additional mirror 190, which deflects the light through a scanner apparatus 10. according to the present invention, to a photomultiplier tube 192. Accordingly, a narrow range of wavelengths, e.g. 50 nm, is selected by rotation by rotation of the defraction grating 182, and the scanner apparatus then scans this range. The photomultiplier tube 192 receives each wavelength transmitted through the scanner apparatus 10.

Figure 3:
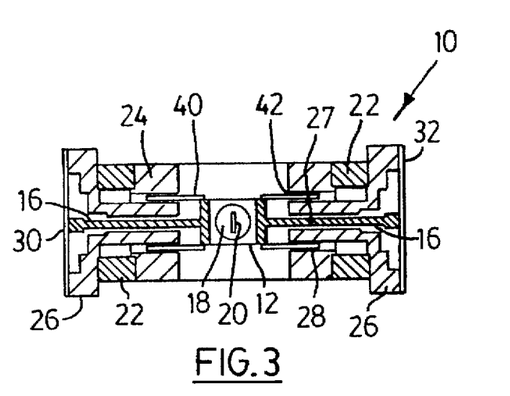
FIG. 3 shows a front view of a scanner mechanism in accordance with the present invention.

Referring to FIG. 3, the scanner apparatus as a whole is designated by the reference 10. The apparatus 10 includes a shuttle 12, which is formed from aluminium—magnesium. The shuttle 12 includes thin rod-like extension arms 16. At the centre of the shuttle 12, a 0.002 inch thick stainless steel foil 18 is mounted. A vertical slit 20 is formed in this foil, the slit 20 having a height of 2 mm and a width of 50 microns. Permanent magnets 22 are provided. Each permanent magnet 22 has an associated outer pole assembly 24 and an inner pole assembly 26. Each pair of pole assemblies 24, 26 defines an annular magnetic gap 28, in which there is a radial magnetic field. As shown in both FIGS. 3 and 4, the outer, free end of each extension arm 16 is attached to the centre of a spiral spring 30. Each spiral spring 30 is formed from cutting a sheet 32, which sheet 32 is secured by screws or the like 34 to a respective inner magnetic pole assembly 26.

Figure 4:
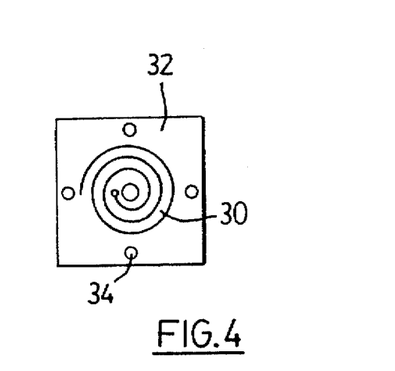
FIG. 4 shows an end view of the scanner mechanism showing a spiral spring structure.

Two drive coils 40 are mounted on the shuttle 12 and are located in the annular magnetic gaps 28. Stationary scanner or position sensing coils 42 are mounted on the end faces of the outer pole assemblies 24. The overall length of the scanner apparatus is approximately 2-inches.

Magnets 22 are short cylindrical permanent magnets, with the pole assemblies 24, 26 being mild steel in known manner. The inner pole assemblies 26 are drilled or provided with bores 27 for free movement of the extension arms 16. The magnets 22 are orientated so that the polarity of the magnetic field in the annular magnetic gaps 28 is the same. The drive coils 40 are connected in parallel with the connections arranged so that the actual forces due to the magnetic field are reinforced. The drive coils 40 are driven directly from the output of a drive circuit 50, which is shown in FIG. 5 and described below in detail.

Figure 5:
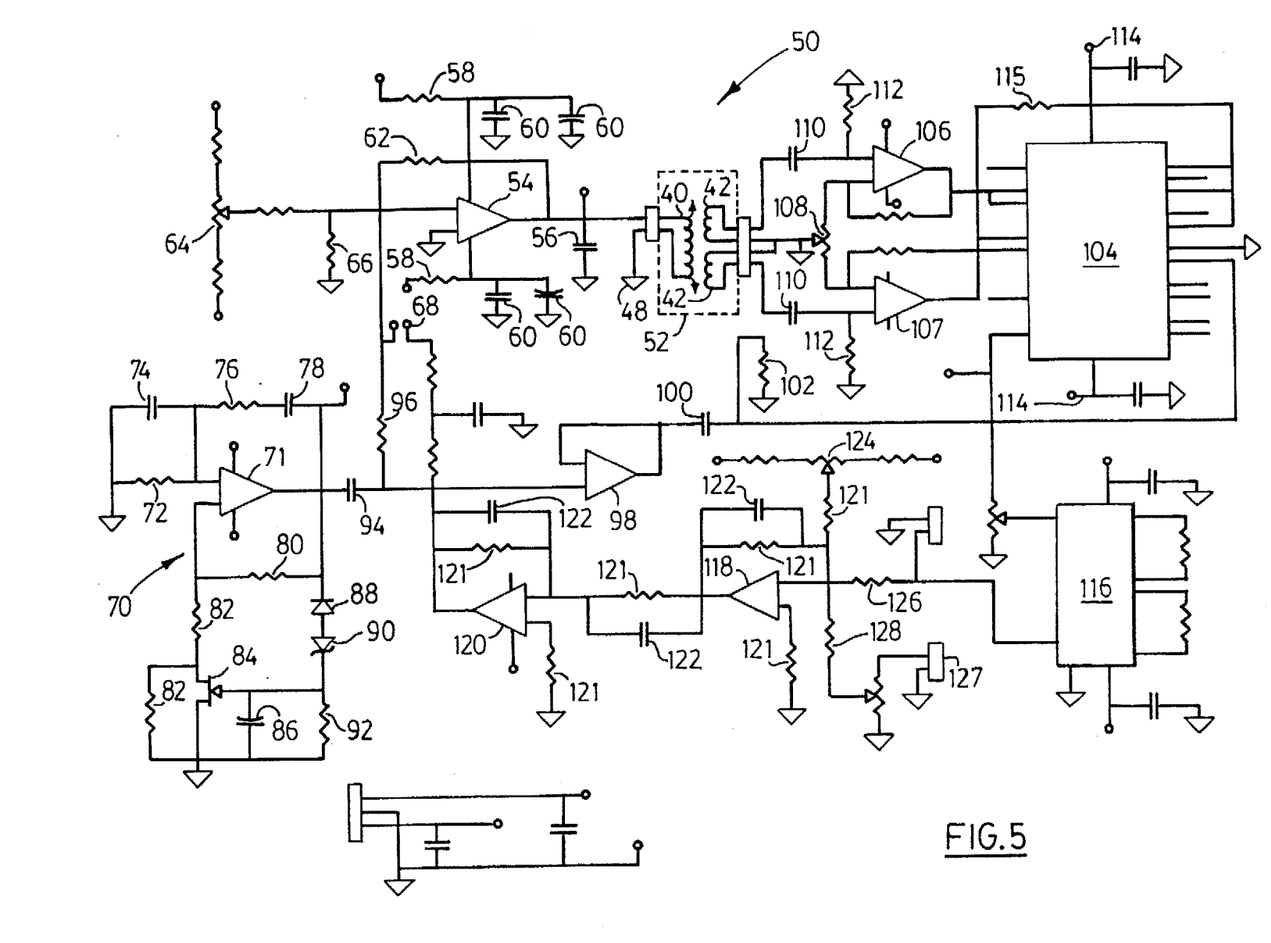
FIG. 5 shows a diagram of a circuit for controlling the scanner device.

In FIG. 5, the scanner apparatus 10 is represented by the drive coils 40 (shown as a single coil) and the pick up or scanner coils 42 inside the dashed box 52 marked LVDT; LVDT designates Linear Variable Differential Transformer. The paralleled drive coils 40 are fed from a power amplifier 54. Power from the amplifier 54 is fed through the drive coils 40 to ground, with all the ground connections being indicated at 48. The output of the amplifier 54 is connected through to ground by a capacitor 56, to eliminate high frequency components.

In known manner, the amplifier 54 is an operational amplifier connected to positive and negative DC input lines by resistors 58 and capacitors 60, connected through to ground, to provide a smoothed DC power supply. A feedback resistor 62 is connected between the input and output. The positive input of the amplifier 54 is connected to ground, while the inverting input is connected to a resistor array 64. As indicated, the resistor array 64 is connected between the positive and negative DC supplies. The array 64 includes a variable resistor and a connection to ground through resistor 66 to enable a variable D.C. level to be supplied to the inverting input of the amplifier 54. The amplifier effectively sums the D.C. level and other alternating signals detailed below.

A jumper plug 68 is provided to complete a servo loop described in greater detail below. With this jumper plug removed, i.e. the loop opened, the variable and the resistor array 64 can be adjusted, thereby altering the DC current injected into the amplifier 54. This in turn affectively alters the null or 0 position of the drive coils 40.

A Wien bridge oscillator indicated generally at 70 includes an operational amplifier 71. It includes a ground connection through a resistor 72 and capacitor 74 connected to the positive input, and a feedback connection including a resistor 76 and capacitor 78, connected in a series, between the output and the positive input. A further feedback loop from the output to the negative input includes the resistor 80. There are also resistors 82 and a field effect transistor 84, capacitor 86, diode 88 and zener diode 90, and a further resistor 92, all forming part of the Wien bridge oscillator. The various components of the oscillator are selected to provide a 20 KHz frequency.

The output of the oscillator is connected through a capacitor 94. This output is further connected through a resistor 96 to the input of the power amplifier 54. It is also connected to a buffer amplifier 98. The output of the buffer amplifier 98 is connected through capacitor 100, to both a ground connection resistor 102 and to an input of a monolithic modulator/demodulator circuit or chip 104.

The outputs of the two scanner coils 42 are connected to respective amplifiers 106 and 107, which are generally configured similarly. The negative inputs of the amplifiers 106, 107 are connected via a variable resistor 108 to ground, the resistor being used to adjust the relative gains of the two amplifiers 106, 107. Connections to the positive inputs of the coils 42 are also connected, by resistors 112, to ground. The variable resistor 108 enables a null or neutral position to be adjusted. Capacitors 110 and resistors 112 provide a connection for scanner coils 42 to the positive inputs to the amplifiers 106, 107. In known manner, the amplifiers 106, 107 have feedback to the negative or inverting inputs and their outputs are each connected to two inputs of the monolithic demodulator chip 104. A resistor 115 is in parallel with a gain-setting resistor internal to the modulator/demodulator chip to equalize the internal gains of the two channels A and B from the amplifiers 106,107, for the particular device configuration used. In known manner, the chip 104 has connections to positive and negative DC supplies 114.

If the scanner is at its rest (neutral) position so that the drive coils are centred with respect to the two stationary pickup coils, the amplitude of the AC signals induced in the pickup coils will be identical. These signals are fed through amplifiers 106 and 107 to the monolithic modulator/demodulator chip 104.

Chip or circuit 104 acts as a synchronous rectifier with its reference signal obtained from the oscillator 20 via the buffer amplifier 98. If the input scanner signals are equal, the output of demodulator 104 is a sine wave, the average of which over time is zero. As the scanner is displaced from its rest position, the signal in one pickup coil increases and the signal in the other decreases. Effectively, in the circuit 104, the amplified outputs of the two scanner coils 42, two sine waves, are rectified and then subtracted from one another. The output, a rectified differential signal, has an amplitude corresponding to the displacement of the shuttle 12.

Under these conditions the output of demodulator 104 shows a signal that is proportional to the difference in amplitudes of the pickup coil signals and hence to the amount of displacement of the scanner from its neutral position.

The output of the demodulator 104 is fed to a monolithic filter 116 which removes the 25 Khz components. The servo loop is completed by the amplifiers 118 and 120 which feed back a control signal via the jumper 68 to the power amplifier 54 and hence to the scanner drive coils. The resistive and capacitative components around amplifiers 118 and 120, indicated generally at 121, 122 are chosen to provide the high gain and frequency response needed to allow stable performance of the servo loop with adequate bandwidth. When the loop is closed, the system will settle to a condition that minimises the current flow into amplifier 118, the so-called "error signal".

Two controls are provided to offset residual errors due to mechanical or electrical offsets. The potentiometer 108 controls the relative gains of the amplifiers 106 and 107 so that when the scanner is mechanically centred the output of the demodulator 104 averages to zero. A control potentiometer or variable resistor 124 feeds an offset signal to the inverting input of amplifier 118 to compensate for any remaining electrical residual offsets.

Figure 7:
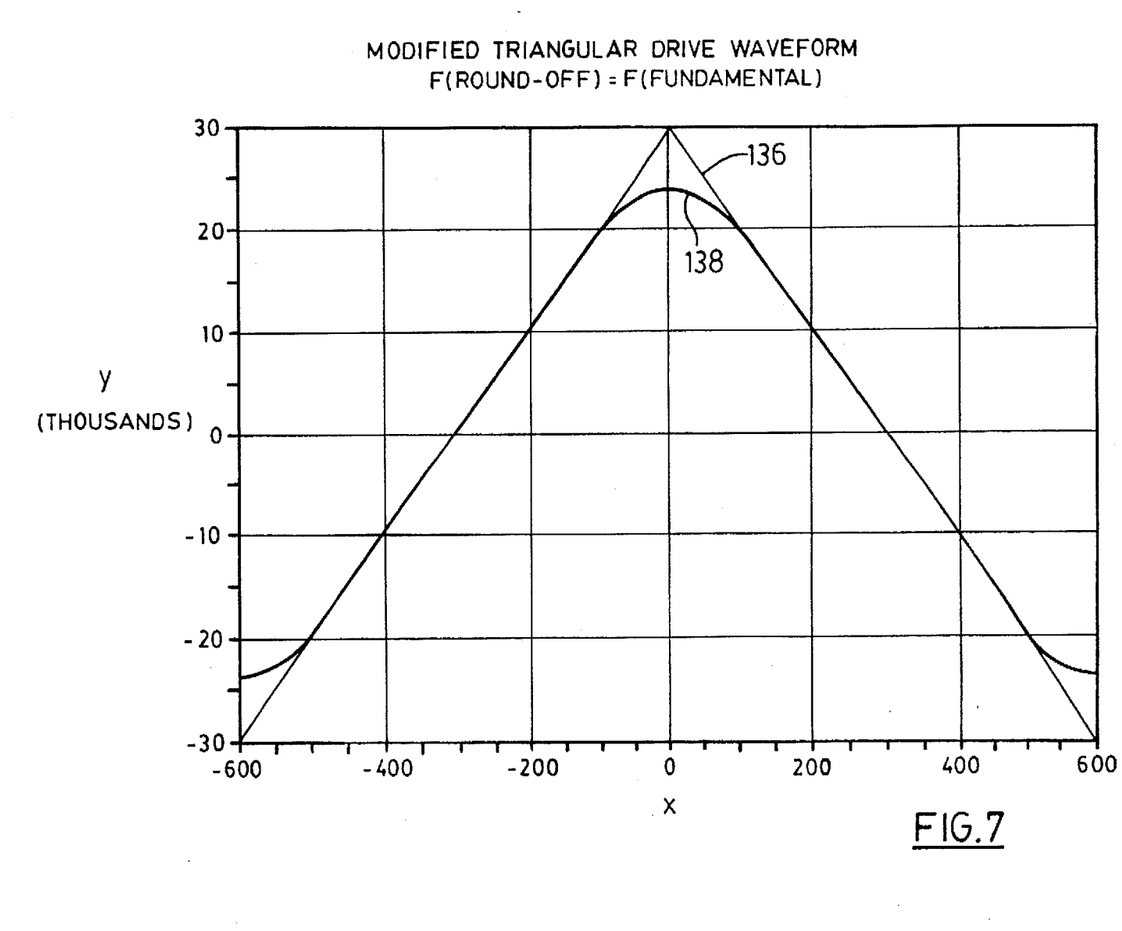
FIG. 7 shows graphically a desired motion for the scanner.

As well as the feedback signal from the filter 116 via a resistor 126, amplifier 118 also accepts a reference waveform from the connector 127 via resistor 128. This reference waveform can be generated in any suitable known manner and is shown in FIG. 7. Here, it is generated by a digital-analog converter on a data acquisition card mounted in the host computer 2. The servo loop responds by altering the current in the scanner coils to minimise the error at the input of amplifier 118. Now, ideally, for linear motion, the velocity of the shuttle 12 should be constant, which implies a triangular waveform. This triangular waveform is generated by the computer, so that the shuttle 12 moves linearly in one direction during one half cycle, and reverses and moves linearly in the other direction during the second half cycle.

A strictly triangular waveform 136 would require the shuttle 12 reversing instantaneously at each end of the motion, i.e. with infinite acceleration. This is not possible, as the shuttle 12 which needs a finite time to decelerate, stop and subsequently accelerate to the new constant velocity. The ideal triangular waveform is therefore modified by slightly "rounding" the waveform at its peak values to allow the scanner to follow the waveform accurately, as shown at 138 in FIG. 7. At the current 30 Hz modulation rate current used, 10% of the triangular waveform at each end of the scanner excursion is used for deceleration and acceleration, leaving 80% of the scan in a linear mode, as is shown in FIG. 7.

The capacitors 110 and resistors 112 at the input of the amplifiers 106 and 107 act as high pass filters to eliminate pickup of the 30 Hz drive signal itself. The scanner drive signal following a 30 Hz reference waveform contains significant high frequency components that can be sensed by the pickup coils. Unless these components are eliminated, the servo loop performance can be affected. Since the filters add some degrees of phase shift, a similar phase shift is introduced in the reference path between the output of the oscillator buffer amplifier 98 and the reference input of the demodulator 104, by the capacitor 100 and resistor 102.

Here, the LVDT position sensor and the associated circuitry provide an electrical voltage that is proportional to the absolute instantaneous position of the slit. A closed loop servo system acts to minimise the difference, the "error signal", between the applied reference signal and the feedback signal from the device being controlled. Therefore, the output of any closed loop servo system with adequate gain and band width should accurately follow the waveform of signals injected at a reference point. In this case, a triangular reference waveform is injected that, for each half cycle, implies a linear change of voltage with time. The output of the servo loop, the change in position of scanner moving element, is therefore, for each half cycle, also linear with respect to time. In practice, the "ends" of each excursion are rounded so that the deceleration and subsequent acceleration demands on the scanner do not become excessive.

The present scanner is substantially free of orientation effects. If, for instance, it is tilted out of the horizontal, the instantaneous current supplied to the coils will immediately be adjusted by the servo loop to minimise the error difference.

A principal improvement in the art of designing wavelength-modulateable spectrometers is the use of a position sensor integral with the scanning device. Previous methods appear to have used sensors that provide amplitude information, but not absolute position information.

Figure 6:
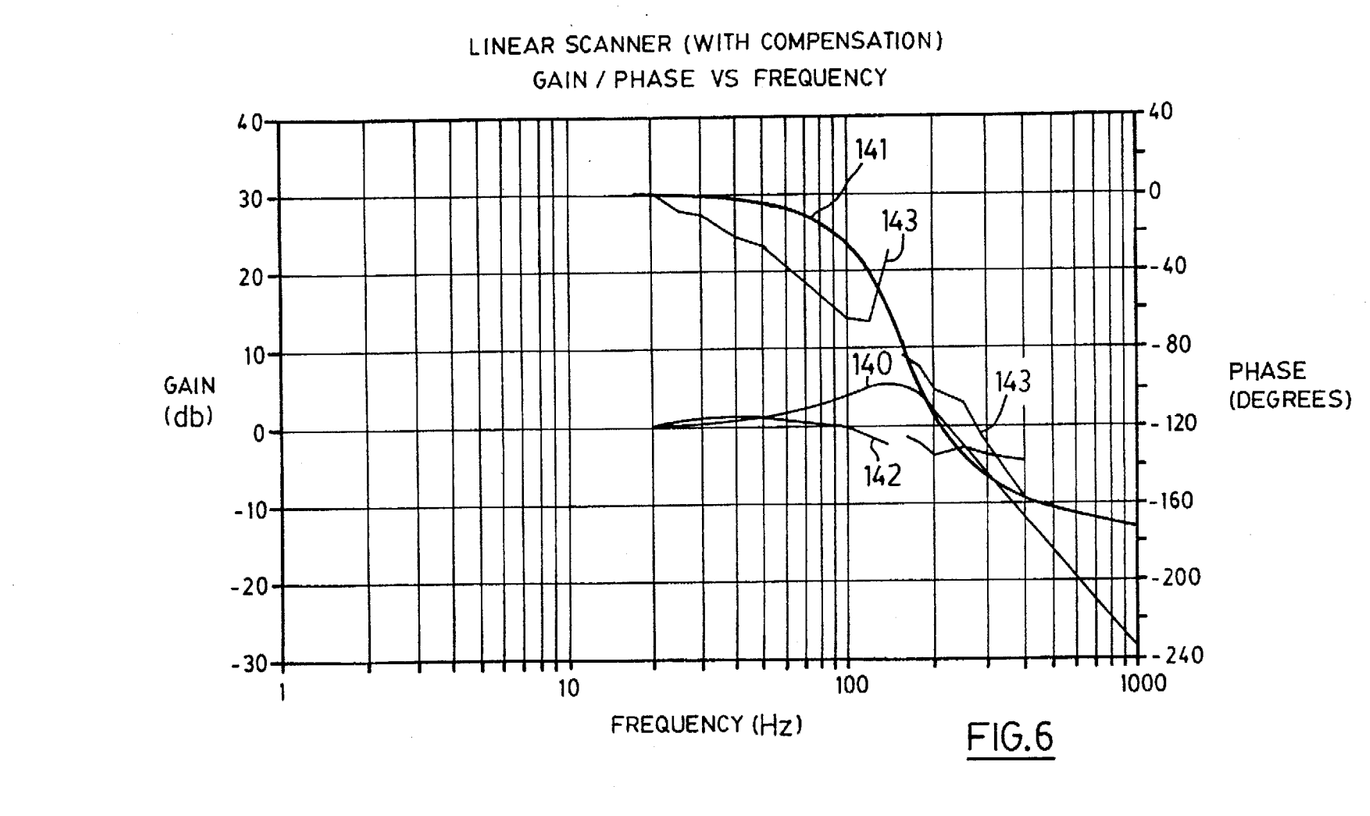
FIG. 6 shows a graph of the variation of gain and phrase with frequency.

FIG. 6 shows the behaviour of the scanner for a range of frequencies of the input waveform. This shows a comparison of the theoretical performance to the actual performance. Curves 140, 141 show the theoretical plots for gain and phase shift. Curves 142, 143 show the actual measurements for these two parameters. It can be seen that they closely follow the theoretical plots, except around 150 Hz. In any event, there is good performance up to 100 Hz, which is sufficient for atmospheric work.

It should be appreciated that the position data can be obtained in a number of ways, that include the LVDT technique described above. For instance, applicants have alternatively used light from an infrared LED shining through a small aperture in the moving shuttle 12 to place a light spot on the surface of an optical position sensitive detector (e.g. Hamamatsu S3932). Circuits are available to convert the signals from such devices to voltages that are proportional to the position of the moving element.

Similarly, it may well be possible to bond a magnetic strip to the shuttle 12. The strip would contain numerous reversals of magnetic orientation, i.e. it would be magnetically striped. A stationary Hall effect device or magnetic head similar to those used in computer disk drives could detect the movement of the stripes past the sensor. By pulse counting, one could then determine the instantaneous position of the shuttle 12. A number of variations of this technique can be employed.

OPTICAL PATH

Figure 8A:
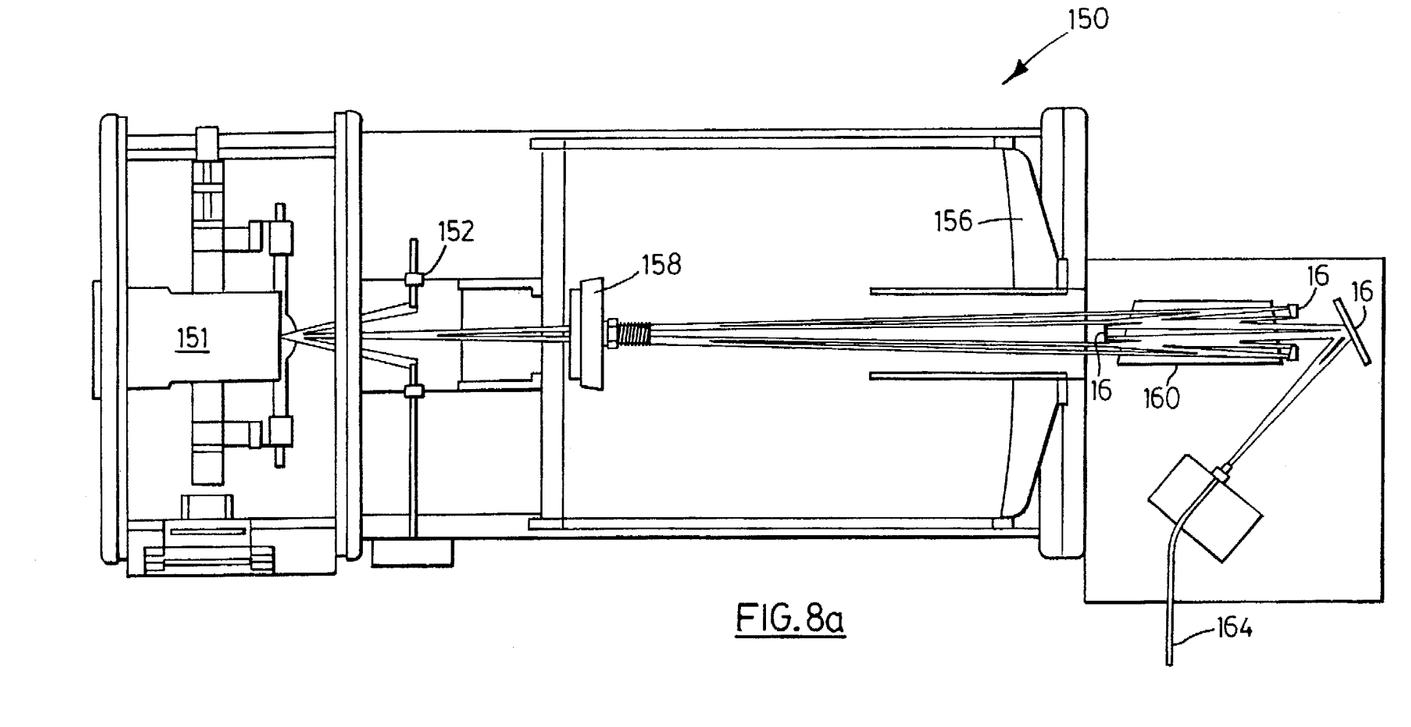
FIG. 8a is a schematic diagram of the optical components of a DOAS apparatus in a calibration mode.
Figure 8B:
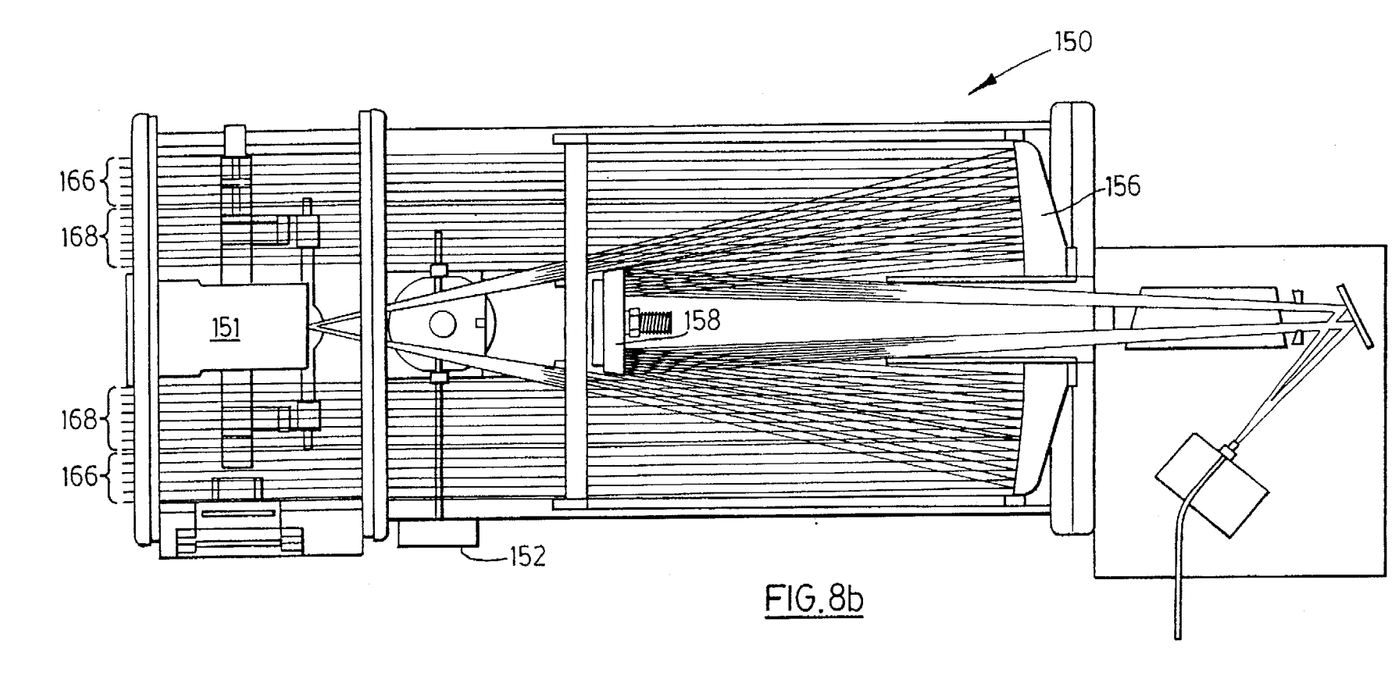
FIG. 8b is a schematic diagram of the optical components of the DOAS apparatus in a measurement mode.

Reference will now be made to FIGS. 8a and 8b which show the telescope assembly generally indicated by reference 150. Historically, differential optical absorption spectroscopy (DOAS) instruments have not used double beam methods. Other spectroscopy instruments have used double beam techniques. Essentially, in a double beam method, the optical path for the lamp is split into two, with one part being transmitted through the sample under test and the other part bypasses the sample, as a reference. The two are then recombined and fed to a suitable detector and modulation is provided to distinguish the two beams. The whole intention is to compensate for artefacts generated by the lamp, which can include changes in lamp output with time and changes in lamp output with spectral interval.

Historically, for DOAS instruments, a low-order polynomial has been fitted to the received spectrum, and the spectrum is then divided by the polynomial. The intention is to achieve a high pass filtering effect, intended to remove spectral artefacts and effects of output drift over time.

While this is true to a certain extent, the lamp sources, xenon arcs, do not have a totally smooth spectrum, and will always show some fine spectral structure after the fitting operation. After subsequent operations of fitting reference spectra to the normalized received spectrum, the structures which show up as small positive or negative artefacts, since any deviation from a totally smooth spectrum will correlate to some finite extent. It is therefore difficult to establish a true zero for the system.

The telescope 150 includes a lamp 151. Adjacent to the lamp is a rotating baffle or shutter 152. The telescope includes a main mirror 156. In the calibration mode of FIG. 8a, the shutter blocks light from reaching the main mirror 156.

Instead, in this calibration mode, light from the lamp is permitted to pass through an aperture in a secondary mirror 158. As shown, it then passes into a reference cell 160, provided with mirrors 161 in known manner causing the light to traverse through the reference cell three times. It is then reflected by a final or deflector mirror 162 to an optical fibre 164, and passes to the detector. In the calibration mode, the reference cell is filled with a suitable reference gas.

In a measurement mode, the reference cell is flushed and filled with zero air. As shown in FIG. 8b, in this measurement mode, the shutter 152 is actuated, to block the light from passing through the aperture of the secondary mirror 158. Rather, light from the lamp is permitted to pass around the outside of the secondary mirror 158 to the main mirror 156, where it is reflected out through the telescope. It then passes through the air under observation, and reflected back by the distant retroreflector mirror 170. The path length can be in the range 1–1,000 meters. The transmitted beam is indicated at 166 and the return beam at 168. The return beam is reflected by the main mirror 156 onto the secondary mirror 158, which in turn directs it through the reference cell, around the mirrors of the reference cell. The final deflector mirror 162 again deflects the beam to the optical fibre 164.

The dimensions of the optical components should be chosen so that the amount of light transmitted to the spectrometer in the calibration and operational modes does not differ by more than a factor of approximately 2 or 3, since otherwise the photomultiplier may not give accurate results.

We claim:

1. An apparatus for use in an optical system, the apparatus comprising: a moveable shuttle including an aperture; drive means for displacing and oscillating the aperture and comprising a pair of drive coils secured to the shuttle, stationary magnetic field means for driving the drive coils, and resilient biasing means biasing the aperture to a neutral position; sensor means for detecting the position of the aperture and comprising a pair of stationary sensor coils mounted for detecting movement of the drive coils and a control circuit connected between the sensor coils and the drive means, for controlling the drive means, the control circuit including a separate input for a desired motion of the aperture, the control circuit controlling the drive means, whereby the moveable aperture follows the desired motion.

2. An apparatus as claimed in claim 1, wherein the control circuit includes a drive amplifier means connected to the drive coils, an oscillator connected to the input of the driver amplifier, and wherein the input for desired motion is connected to the input of the drive amplifier.

3. An apparatus as claimed in claim 2, wherein the outputs of the sensor coils are connected through error signal demodulator amplifiers to a synchronous rectifier, and wherein the oscillator is connected to the synchronous rectifier.

4. An apparatus as claimed in claim 3, wherein the output of the synchronous rectifier is connected to a low pass filter, for filtering out the high frequency signal.

5. An apparatus as claimed in claim 4, wherein the output of the low pass filter is connected through summing and compensation amplifiers to the input of the driver amplifier, with the input for the desired motion being connected to the input of the summing amplifier.

6. An apparatus as claimed in claim 1, which includes: a main support body to which the stationary magnetic field means is mounted; extension arms extending out from the shuttle, and wherein the resilient biassing means is connected to the extension arms and both supports the shuttle for linear motion along an axis and resiliently biasses the shuttle to a zero position.

7. An apparatus as claimed in claim 6, wherein the extension arms are elongate and the resilient biassing means comprises, for each extension arm, a spiral spring, one outer end of which is secured to the main body and the inner end of which is attached to an end of the respective extension arm.

8. An apparatus as claimed in claim 7, wherein the stationary magnet held means comprises a pair of permanent magnets, each of which includes respective inner and outer pole assemblies, wherein the magnets and the pole assemblies are secured to the main support body and, for each magnet, the inner and outer pole assemblies define an annular magnetic gap, and wherein there are two drive coils secure to either side of the shuttle, with each drive coil being mounted in a respective annular magnetic gap.

9. An apparatus as claimed in claim 8, wherein the inner pole assembly defines a bore and wherein the extension arms extend through the bores of the inner pole assemblies.

10. An apparatus as claimed in claim 9, wherein each spiral spring is formed in a sheet and the periphery of the sheet is secure to a respective inner pole assembly.

* * * * *